REEL SUPPORT

Filed Dec. 28, 1964

INVENTOR.
ROBERT A. PENDLETON

BY Fred Jacob

ATTORNEY.

United States Patent Office 3,272,451
Patented Sept. 13, 1966

3,272,451

REEL SUPPORT

Robert A. Pendleton, Dedham, Mass., assignor to Honeywell Inc., Minneapolis, Minn., a corporation of Delaware Filed Dec. 28, 1964, Ser. No. 421,363
7 Claims. (Cl. 242—68.3)

Figures 1, 2:
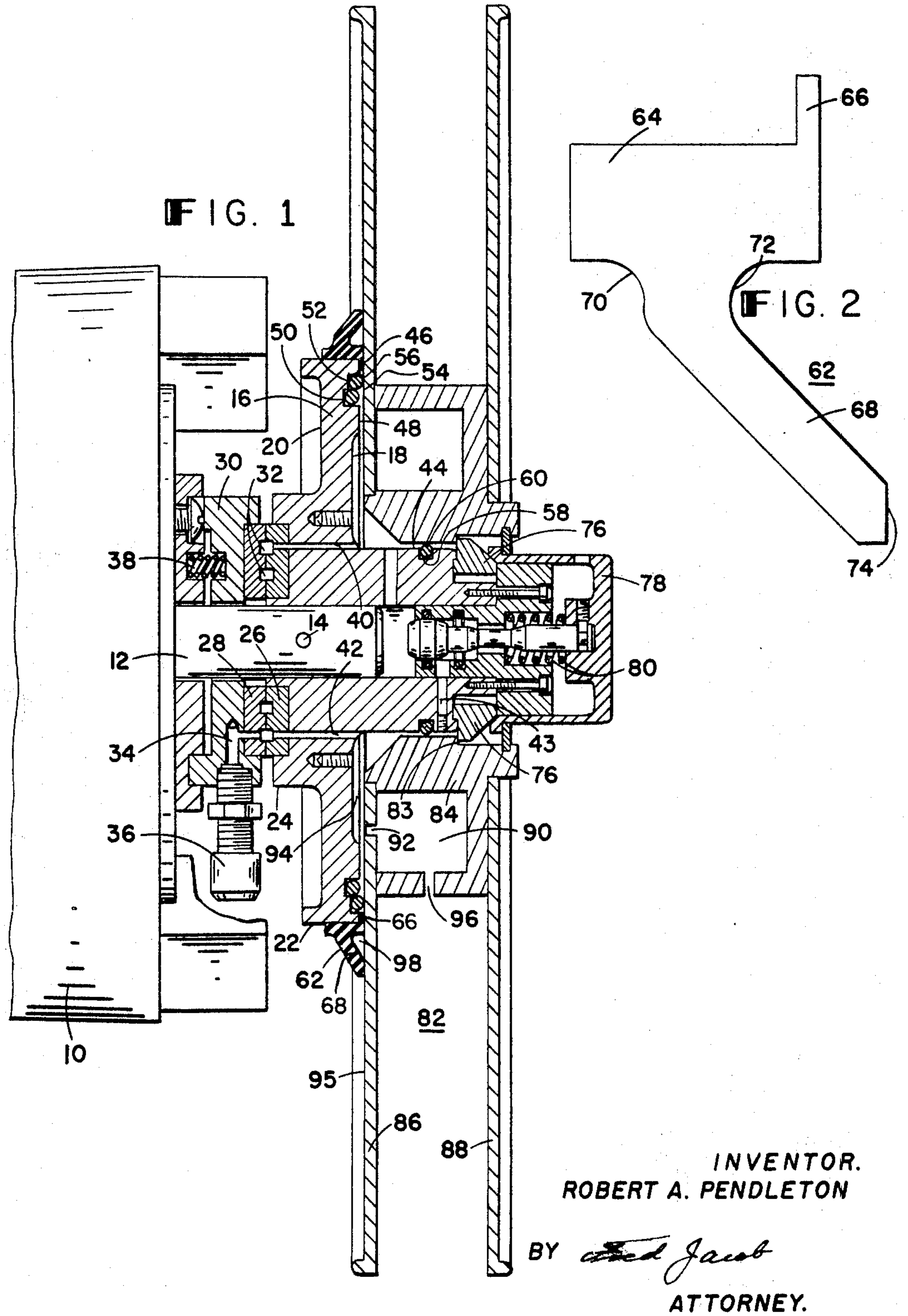

The present invention relates in general to new and improved data processing apparatus and in particular to an improved reel mount in a tape transport for transmitting power between a rotary source and a tape reel.

Vacuum pressure is advantageously used to retain a tape reel in place on its mount in a high-speed tape transport. This is particularly the case in tape transports where a source of vacuum pressure is already present which operates in conjunction with a loop chamber positioned between the data transfer station and each tape reel to maintain the tape under tension. Tape transports of this type are shown in Patents Nos. 2,998,206 and 3,145,944 by Robert A. Pendleton, both assigned to the assignee of the present application.

It is frequently necessary to exchange tape reels during a single computer run. The reason therefor lies in the fact that the particular data or programs required for the computer run may be contained on a plurality of tapes, each spooled on its own reel. Thus, during the operation of the tape transport, one of the reels usually remains in place while the other, which has the tape spooled on it, is removed and is replaced with another tape-carrying reel. The removal of a tape reel from a vacuum-operated reel mount requires the cycling down of the entire tape transport. Specifically this entails turning off the vacuum pump and venting the vacuum associated with the reel. The tape reel may then be removed by disengaging it from the mechanical holding mechanism which prevents it from slipping off the mount in the absence of vacuum pressure.

Following the positioning of the new tape reel on the mount, vacuum pressure is applied to the surface of the reel which faces the mount in order to hold the reel in place. In the aforesaid Pendleton patents, a fluid-tight, motion-transmitting seal is established between the mount and the facing reel surface by O-rings positioned on the mount and annularly surrounding the hub thereof. In addition, one or more sealing rings are interposed between the exterior hub surface of the reel mount and the interior surface of the hub which is on the reel itself.

Normally, the O-rings rise above their respective mount surfaces. When the reel is in place, they are compressed and establish the sole friction surfaces for transmitting rotary power from the mount to the reel. Since the O-rings perform a seating as well as a sealing function, they must have a predetermined hardness which will predictably position the tape reel as required. This is important, since any misalignment of the tape reel, or failure to run true, will cause undesired friction to occur between the edges of the tape and the reel flanges. Such friction produces tape dust which ultimately becomes embedded in the tape and affects its recording and readout properties.

While the vacuum mounts disclosed in the aforesaid Pendleton patents work well under the conditions for which they are intended, present day tape transports must be capable of operating under far more severe conditions. Thus, where larger lengths of tape are carried by a single reel than was heretofore the case, the increased inertia of the reel may cause it to be wrenched free of the reel mount when rapid braking or a reversal of reel motion occur. This is especially true in present day tape transports where such reel movements are carried out at much higher speeds.

A sudden change of the motion of the mount may produce a temporary separation between the O-rings and the facing reel surface. The resultant loss of vacuum has a cumulative effect so that the coupling between the mount and the tape reel is almost immediately lost. When this occurs, an appropriate sensing device cycles down the vacuum pump and brings all tape transport operation to a halt. In such a case, it is necessary to re-position the tape reel firmly on the O-rings and to cycle up the vacuum pump again before tape transport operation can be resumed. Clearly, such an interruption entails a delay in the particular computer run in process. Frequently, this requires a new start of the entire program with the concomitant loss of time.

As previously explained, the O-rings perform a seating as well as a sealing function with respect to the facing surface of the tape reel, the seating function requiring the O-rings to have a predetermined hardness or durometer. Accordingly, it is necessary in positioning a tape reel on the mount, to exert pressure in the vicinity of the O-rings so that a proper seal is established. When the tape reel is removed in order to be exchanged, the tape transport is cycled down, as previously explained. After the new tape reel is in position, the tape transport is cycled up again and the reel is firmly pressed against the mount, or tapped, in order to establish a seal. The removal of vacuum pressure by cycling down the tape transport also causes the remaining tape reel, i.e. the one which has no tape spooled thereon, to lose its seal. Accordingly, the operator must remember to press the empty reel against the mount before the tape transport operation can be safely resumed. Similarly, both tape reels must be repositioned firmly on the O-rings when only one of them is wrenched free. This is due to the fact that the tape transport under these conditions is automatically cycled down, as explained above.

The procedure thus required is not only time-consuming, but it is frequently not observed with regard to one or both reels. This is particularly the case where the operator's skill and experience are limited. As a consequence, only a marginal seal may be established between the tape reel and the O-rings which will fail under severe operating conditions.

Accordingly, it is the primary object of the present invention to provide a vacuum mount for a tape transport which is not subject to the foregoing disadvantages.

It is a further object of the present invention to provide a vacuum mount for a tape transport which is capable of securely holding a tape reel in place under severe operating conditions.

It is another object of the present invention to provide a simple and economical vacuum-operated reel mount where the seal established between the mount and the tape reel has self-sealing properties.

These and other objects of the present invention, together with the features and advantages thereof, will become apparent from the following detailed specification, when read together with the accompanying drawings in which:

FIG. 1 is a cross-sectional view showing a preferred embodiment of the present invention; and FIG. 2 illustrates an enlarged detail of the apparatus of FIG. 1.

With reference now to the drawings, a reel drive motor 10 contains a motor shaft 12 which is fixed to the mount by means of a pin 14. The mount assembly includes a face plate 16 coaxial with the shaft 12 and having a cylindrical periphery 22, as well as forward and rear surfaces 18 and 20 respectively, normal to the shaft axis. The rear surface includes a boss 24 which has a seal ring structure 26 set into its rearwardly facing surface. As shown in FIG. 1, the seal ring structure of the preferred embodiment presents three sealing surfaces to three mating surfaces of a similar sealing structure 28 which is set into a stationary vacuum pressure assembly 30. The parts 26 and 28 annularly surround the shaft 12 and are preferably made of graphite or the like, to present mutually contacting annular sealing surfaces having a low coefficient of friction which permits relative motion therebetween. Annular grooves 32 are defined between the aforesaid contacting surfaces. The vacuum pressure assembly 30 further includes an inlet conduct 34 which communicates between a fitting 36, adapted to be coupled to a source of vacuum pressure and the annular grooves 32. A plurality of compression springs 38, spaced around the drive shaft 12, urges the assembly 30 in a forward direction (to the right in the drawing) to provide close contact between the annular sealing surfaces of the parts 28 and 26.

Two passages 40 and 42 communicates between the outer one of the aforesaid annular grooves 32 and the forward surface 18 of the face plate 16. A further passage, not shown, couples the inner one of the annular grooves 32 and a conduit 43, the latter communicating with the interior of a coaxial hub or boss 44 on the forward surface 18. The purpose of applying vacuum pressure to the hub interior involves a protective tape transport feature which forms no part of the present invention. The forward surface 18 further includes outer and inner rims having annular surface portions 46 and 48 respectively, positioned forward of, i.e. disposed above, the forward surface proper and parallel therewith.

Positioned between the surface portions 46 and 48 is a pair of annular grooves 50 and 52 concentrically adjacent to each other. In a preferred embodiment of the invention, the outer groove 52 is shallower than the inner groove by approximately 10 mils. A pair of O-rings 54 and 56 is cemented into the grooves 50 and 52 respectively, each ring normally extending forward of the surface portions 46 and 48. The O-rings are of substantially identical cross section and Shore durometer, the latter being of the order of 70 in the preferred embodiment of the invention. Since the groove 52 is shallower than the groove 50, the outer O-ring 56 extends further forward than the inner O-ring 54. For the sake of illustrating the present invention, the O-rings are shown uncompressed. A sealing ring 60, which is located in a groove 58 in the outer surface of the boss 44, is similarly shown in its normal, uncompressed state.

An annular boot 62 is located on the face plate 16 and is made of rubber having a Shore durometer of the order of 50 in the preferred embodiment of the invention. The boot is shown in enlarged view of FIG. 2 and includes a base 64 which is cemented to the periphery 22. A minor lip 66 extends radially inward from the forward end of the base, at right angles to the latter. The minor lip is seen from FIG. 1 to overlie the outer annular surface portion 46 onto which it is cemented. A major lip 68 extends outward at an angle from approximately the center of the base 64 and is undercut near the latter in the regions 70 and 72 to afford greater flexibility. The major lip terminates in a surface 74 which is normally positioned forward of the minor lip by approximately 75 mils and which is parallel thereto. In its normal position, the surface 74 is also located forward of the outer O-ring 56.

A plurality of collets 76, mutually spaced at regular intervals around the hub 44, is adapted to prevent the reel from slipping off its mount in the absence of vacuum pressure. Upon the application of a force in the rearward direction against a pusher cap 78, acting in opposition to the force applied by a compression spring 80, the outside perimeter defined by the collets 76 is collapsed to permit the installation or removal of a tape reel 82. When the pressure on the cap 78 is released, the collets 76 move radially outward to engage a step 83 in the hub 84 of the reel.

The interior surface of the reel hub 84 serves to compress the sealing ring 60 which is located in the groove 58 of the boss 44 to establish a fluid-tight seal when vacuum pressure is applied. The reel 82 further includes a pair of flanges 86 and 88 which serve to hold the spooled tape in position. A hollow hub portion 90 communicates through a hole 92 with a space 94 that is defined between the forward face plate surface 18, the facing surface 95 of the reel flange 86, the annular surface portion 48 and the mutually facing surfaces of the reel hub 84 and the boss 44. This space is sealed at one end by the O-rings 54, 56 and at the other end by the sealing ring 60. A second space 98 is defined primarily between the major lip 68 and the reel surface 95 and is sealed by the surface 74 and the outer O-ring 56.

A plurality of holes 96 communicates between the hollow space 90 and the outer surface of the reel hub on which the tape is to be wound. The purpose of the holes 96, of which only a single hole is shown in the view illustrated in FIGURE 1, is to apply vacuum pressure to the end of the tape which is to be spooled on the reel 82. This serves to hold the tape end in place when the tape is initially threaded onto the reel.

As previously explained, the O-rings normally extend beyond the annular surface portions 46 and 48, the outer O-ring 56 rising beyond the inner ring 54. The major lip surface 74 is normally positioned forward of the outer ring 56. Similarly, the sealing ring 60 normally extends beyond the outer surface of the hub 44. When the reel 82 is mounted in position and vacuum pressure is applied through the fitting 36, the vacuum is communictaed through the inlet conduit 34 and the passages 40 and 42 to the aforesaid space 94. This causes the tape reel 82 to be attracted toward the forward surface 18, such that the reel surface 95 urges the major lip 68 to the position shown. The resultant flexing of the lip 68 is aided by its undercut areas 70 and 72 and by the relatively low durometer of the boot material.

The seal established between the surfaces 74 and 95 aids the applied vacuum to draw the reel 82 into still closer contact. The outer O-ring 56, and subsequently the inner O-ring 54, are compresesed by the surface 95. The sealing ring 60 is compressed by the interior reel hub surface. The O-ring 54 firmly seats the reel against further motion to the rear. The minor lip clears the reel surface 95 in this position. Thus, seals are established with the reel surface 95 by the major lip 68 and by the O-rings 56 and 54. The rubber surfaces which constitute these three annular seals, frictionally engage the surface 95 to transmit the motion of the mount to the tape reel 82.

The normal position of the surface 74 forward of the outer ring 56 causes it to remain in flexible contact with the reel surface 95, even when vacuum pressure is not applied. As a consequence, the installation of a tape reel requires no additional safeguard procedure by the operator, such as manual tapping of the reel, after the reel has been positioned on the boss 44 and the manual pressure on the cap 78 has been released. The subsequent cycling up of the tape transport, i.e. the application of vacuum pressure, automatically establishes a fluid-tight seal. Similarly, when the tape transport is cycled down, e.g. in order to exchange the reel on which the tape is spooled, a subsequent cycling up does not require the empty tape reel, which remains on the tape transport during this operation, to be manually forced against the O-ring seals. The self-sealing property of the annular boot then automatically restores a fluid-tight seal without additional attention from the operator.

The spaces 94 and 98 constitute separate reservoirs of vacuum pressure which enable the tape transport to withstand a temporary loss of the seal without interruption of its operation. As previously explained, the relatively high durometer of the O-rings which is required by their reel seating function, in many instances renders it impossible for the rings alone to re-establish the seal. Specifically, this inability stems from the relatively small compression of the O-rings which limits the extent to which they can follow the withdrawing reel surface 95. The broken fluid seal must, however, be re-established before the two reservoirs are exhausted. The presence of the addiional seal provided by the boot 62 materially extends the ability of the vacuum mount to withstand abrupt changes of motion, even where a tape reel having high inertia is involved. This is due to the fact that mechanical contact between the reel surface 95 and the lip surface 74 is never lost while the reel 82 is on the mount. The flexibility of the major lip, aided by its relatively low durometer and the undercut areas 70 and 72, constantly urges the lip surface 74 to its normal forward position. Thus, the application of vacuum pressure produces a sealing contact with the reel surface 95, such that a seal between the latter surface and the O-rings is quickly re-established.

A reel mount which incorporates the features of the present invention is capable of abruptly reversing its direction of motion even when the reel carried by it is fully spooled with tape and has high inertia. Such operation will not reseult in the wrenching free of the reel from the mount even if contact is temporaritly lost between the O-rings and the reel surface 95. The double safety reservoir, coupled with the fact that mechanical contact between the boot and the reel is maintained throughout, quickly serves to re-establish the seal between the O-rings and the reel to assure continuous tape transport operation.

From the foregoing disclosure of the present invention, it will be apparent that numerous modifications, substitutions and equivalents will now occur to those skilled in the art, all of which fall within the true spirit and scope contemplated by the present invention.

What is claimed is:

1. A vacuum mount adapted to transmit power between a drive shaft and a removable reel, comprising a face plate coaxial with the axis of said drive shaft and having forward and rear surfaces, an opening in said rear surface adapted to accept said drive shaft, means for mechanically fastening said mount to said shaft, stationary means annularly surrounding said shaft and adapted to receive vacuum pressure, annular means on said rear surface cooperating with said stationary means to establish a fluid-tight seal therebetween, a plurality of passages communicating between said annular means on said rear surface and said forward surface, a coaxial boss on said forward surface adapted to mate with the hub of said reel, a pair of concentrically spaced, annular surface portions positioned forward of said forward surface, the outer one of said annular surface portions being adjacent the periphery of said face plate, a pair of annular grooves adjacently located between said annular surface portions, the outer one of said grooves having a shallower depth relative to said surface portions than the inner groove, a pair of compressible O-rings of substantially identical cross section and durometer positioned in said grooves and normally extending forward of said annular surface portions, and a compressible annular boot having a durometer less than that of said O-rings, said boot including a base disposed on said periphery and an inwardly extending minor lip overlying said outer annular surface portion, a major lip extending outward at an angle relative to said base to a point normally forward of said outer O-ring, said major lip terminating in a surface parallel to said minor lip and radially spaced therefrom, said O-rings and said boot being adapted to establish a fluid-seal with a facing surface of said reel when said vacuum pressure is applied to cause said reel to move with said mount.

2. The apparatus of claim 1 wherein the outer surface of said boss includes an annular groove, and a compressible ring positioned in said groove adapted to establish a seal with the interior surface of said reel hub.

3. In a tape transport, a rotatable mount including forward and rear surfaces substantially normal to the axis of rotation, means for applying vacuum pressure to said rear surface, a plurality of passages communicating between said surfaces, first and second rims including concentrically spaced annular surface portions disposed above said forward surface, the outer one of said annular surface portions being positioned adjacent the periphery of said mount, a pair of compressible O-rings concentrically positioned adjacent each other between said annular surface portions and normally rising above the latter, the outer one of said O-rings rising above the inner one, and a compressible annular boot having a base positioned on said periphery, said booth further including an inwardly extending minor lip substantially perpendicular to said base and overlying said outer annular surface portion, and a major lip undercut near said base and extending outward therefrom at an angle, the terminal portion of said major lip being radially spaced from said minor lip and normally rising above said outer ring, said boot and said O-rings being jointly adapted, upon the application of vacuum pressure to said rear surface, to hold a reel in fixed relationship relative to said mount by establishing a fluid-tight seal with a facing surface of said reel.

4. A vacuum mount for transmitting power between a rotary source adapted to be fastened thereto and a removable reel, comprising a face plate coaxial with the axis of rotation and having forward and rear surfaces, means for applying vacuum pressure to said rear surface, at least one passage communicating between said surfaces to transmit said vacuum pressure, means on said forward surface adapted to engage said reel, a coaxial annular surface portion on said face plate positioned forward of said forward surface and including at least one annular groove, a compressible sealing ring disposed in said groove and normally rising above said annular surface portion, and a flexible annular rubber boot on said face plate concentrically surrounding said sealing ring, said boot including a lip terminating in an annular surface radially spaced from said annular surface portion and positioned forward of said sealing ring, said ring and said boot being adapted to engage a facing surface of said reel in fluid-sealing relationship upon the application of vacuum pressure.

5. In a tape transport, a rotatable vacuum reel mount for transmitting power between a rotary source and a removable reel, said mount being adapted to be fastened to said rotary source and including a disc-like face plate having forward and rear surfaces substantially normal to the axis of rotation, said forward and rear surfaces each including a coaxial boss, the boss on said forward surface being adapted to engage said tape reel, stationary means engaging the boss on said rear surface in fluid-sealing relationship and adapted to apply vacuum pressure thereto, a plurality of passages communicating between said forward surface and the area of vacuum pressure application, said forward surface further including an outer rim adjacent the periphery of said face plate and an inner rim concentrically spaced from said outer rim, said rims terminating in a pair of concentric annular surface portions extending forward of said forward surface and parallel thereto, a pair of concentric annular grooves located adjacent each other between said rims, the outer groove having a shallower depth than the inner groove, a pair of rubber-O-rings positioned in said grooves and having substantially identical cross sections and durometers, said rings normally protruding forward unequal distances beyond said annular surface portions, and an annular rubber boot of a durometer less than that of said rings, said boot including a base cemented to the periphery of said face plate and a minor lip perpendicularly extending inward from the end of said base and cemented to the annular surface of said outer rim, a major lip obliquely extending outward substantially from the center of said base and being undercut in the vicinity of the latter, said major lip terminating in a surface parallel to said minor lip and radially spaced therefrom, said last recited surface being normally positioned forward of the outer one of said O-rings, said rings and said major lip being adapted to engage a facing surface of said reel in fluid-tight relationship when vacuum pressure is applied to cause said reel to move with said mount.

6. The apparatus of claim 5 wherein said tape reel has a hollow hub adapted to be engaged by the boss on said forward surface, said last recited boss being hollow and including an external annular groove, a sealing ring positioned in said last recited groove to establish a fluid seal with the interior surface of the mating reel hub, said plurality of passages further communicating with the hollow interior of said forward boss.

7. The apparatus of claim 5 wherein said mount further includes means adapted to cooperate with said reel to retain the latter on said mount in the absence of vacuum pressure.

References Cited by the Examiner

UNITED STATES PATENTS

| | | | |
|---|---|---|---|
| 2,998,206 | 8/1961 | Pendleton | 242—68.3 X |
| 3,145,944 | 8/1964 | Pendleton | 242—68.3 X |

FRANK J. COHEN, *Primary Examiner.*

MERVIN STEIN, N. L. MINTZ, *Assistant Examiners.*